US012691503B2

(12) United States Patent
Stangl et al.

(10) Patent No.: US 12,691,503 B2
(45) Date of Patent: Jul. 28, 2026

(54) CLAMPING JAW AND CHUCK

(71) Applicant: RÖHM GMBH, Sontheim/Brenz (DE)

(72) Inventors: Martin Stangl, Nersingen (DE);
Christian Neubauer, Mönchsdeggingen
(DE); Andreas Dolpp, Syrgenstein
(DE); Jens Grässle, Oggenhausen
(DE); Steffen Kränzle, Demmingen
(DE)

(73) Assignee: RÖHM GMBH, Sontheim/Brenz (DE)

( * ) Notice: Subject to any disclaimer, the term of this
patent is extended or adjusted under 35
U.S.C. 154(b) by 440 days.

(21) Appl. No.: 18/279,622

(22) PCT Filed: Mar. 15, 2022

(86) PCT No.: PCT/EP2022/056667
§ 371 (c)(1),
(2) Date: Aug. 31, 2023

(87) PCT Pub. No.: WO2022/200120
PCT Pub. Date: Sep. 29, 2022

(65) Prior Publication Data
US 2024/0139830 A1 May 2, 2024

(30) Foreign Application Priority Data

Mar. 25, 2021 (DE) ..................... 10 2021 107 489.4

(51) Int. Cl.
B23B 31/16 (2006.01)
B23Q 17/00 (2006.01)
(52) U.S. Cl.
CPC ...... B23B 31/16275 (2013.01); B23Q 17/005
(2013.01); B23B 2231/26 (2013.01); B23B
2260/128 (2013.01)

(58) Field of Classification Search
CPC ... B23B 31/12; B23B 31/1215; B23B 31/123;
B23B 31/16; B23B 31/16279;
(Continued)

(56) References Cited

U.S. PATENT DOCUMENTS 302,649 A * 7/1884 Carleton ........... B23B 31/16275
279/123
435,405 A * 9/1890 Cushman .......... B23B 31/16275
279/123
(Continued)

FOREIGN PATENT DOCUMENTS

CN 103817360 A * 5/2014 ............. B23B 31/16
CN 110695387 A * 1/2020 ............. B23B 31/16
(Continued)

OTHER PUBLICATIONS

International Search Report in PCT/EP2022/056667, mailed Jul. 11,
2022.
(Continued)

*Primary Examiner* — Nicole N Ramos
(74) *Attorney, Agent, or Firm* — Collard & Roe, P.C.

(57) ABSTRACT

A clamping jaw for a chuck includes a jaw body on which
there is formed at least one jaw step having a step head,
which has a sensor on its end face, for holding a clamping
insert which is formed from a base leg and two fastening
legs projecting from the base leg. On each of the opposite
longitudinal sides of the step head there is formed a threaded
bore for receiving a fastening screw whose screw head is
received in a through-opening which is formed in the
fastening leg of the clamping insert that is assigned to the
longitudinal side, wherein, on each side, the longitudinal
axes of the threaded bore and of the through-opening
assigned thereto have an offset when the base leg bears
against the end face. Also, a chuck has a chuck body, in (Continued)

Figure 1:
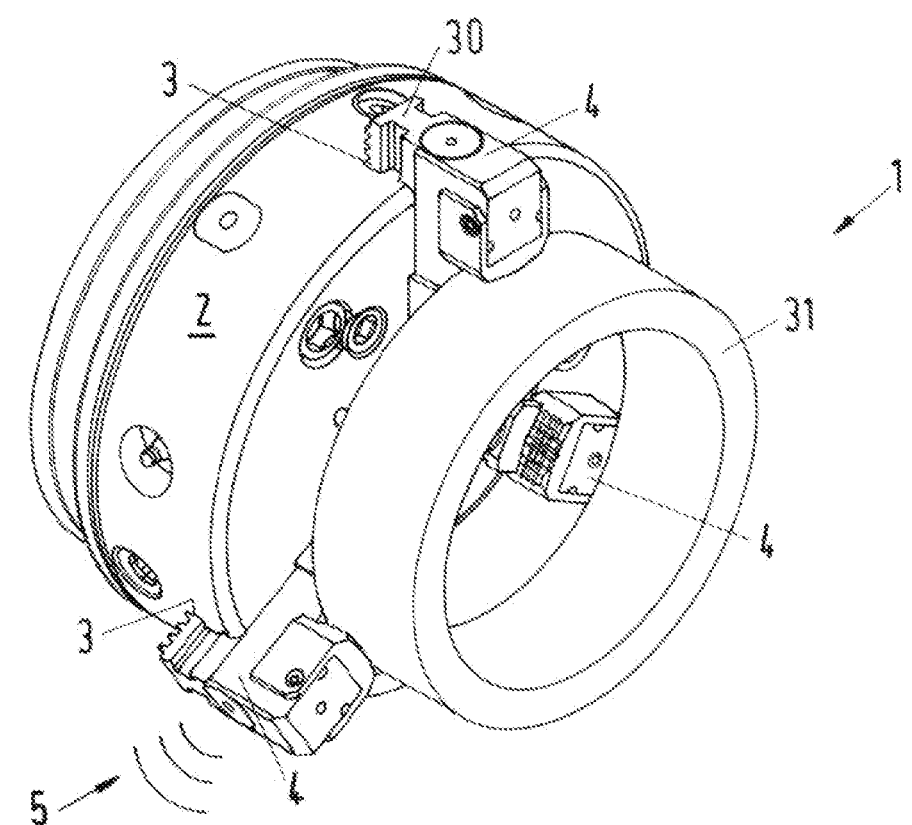

which such clamping jaws are arranged in uniformly-distributed radial jaw guides.

11 Claims, 8 Drawing Sheets

(58) Field of Classification Search
CPC .......... B23B 31/16275; B23B 2231/26; B23B 2231/32; B23B 2231/34; B23B 2231/341; B23B 2231/342; B23B 2260/128; B23Q 17/005
See application file for complete search history.

(56) References Cited

U.S. PATENT DOCUMENTS

| | | | | |
|---|---|---|---|---|
| 1,799,019 A | * | 3/1931 | Mischler | ............... C03B 23/045 |
| | | | | 279/151 |
| 2,757,008 A | * | 7/1956 | Lane | ................. B23B 31/16275 |
| | | | | 279/123 |
| 4,353,561 A | * | 10/1982 | Peterson | ........... B23B 31/16275 |
| | | | | 269/134 |
| 4,546,988 A | | 10/1985 | Gailey | |
| 4,658,680 A | | 4/1987 | Nascher | |
| 4,960,285 A | * | 10/1990 | Doi | ................... B23B 31/16275 |
| | | | | 279/123 |
| 2005/0218608 A1 | * | 10/2005 | Taglang | ............ B23B 31/16279 |
| | | | | 279/121 |

FOREIGN PATENT DOCUMENTS

| | | | | | |
|---|---|---|---|---|---|
| CN | 112296752 A | * | 2/2021 | ............. | B23Q 17/00 |
| DE | 879 944 C | | 6/1953 | | |
| DE | 1004449 B | * | 3/1957 | ....... | B23B 31/16275 |
| DE | 4220136 C1 | * | 9/1993 | ....... | B23B 31/16275 |
| DE | 20 2013 104 141 U1 | | 12/2014 | | |
| DE | 102016222996 A1 | * | 5/2018 | ....... | B23B 31/16275 |
| DE | 102018007186 A1 | * | 3/2020 | ....... | B23B 31/16295 |
| DE | 10 2019 109 856 A1 | | 10/2020 | | |
| EP | 2 848 337 A1 | | 3/2015 | | |
| FR | 1356656 A | * | 7/1964 | ....... | B23B 31/16275 |
| FR | 2523884 A1 | * | 9/1983 | ............. | B23B 27/08 |
| FR | 2684579 A1 | * | 6/1993 | ............. | B23Q 1/38 |
| FR | 3067956 B1 | * | 8/2019 | ....... | B23B 31/16275 |
| GB | 1354695 A | * | 6/1974 | ....... | B23B 31/16275 |
| JP | 61182708 A | * | 8/1986 | ....... | B23B 31/16279 |
| JP | 6836637 B1 | * | 3/2021 | ....... | B23B 31/16283 |
| KR | 200437457 Y1 | * | 12/2007 | ............. | B23B 31/16 |
| TW | 479809 U | * | 6/2014 | ............. | B23B 31/16 |
| WO | WO-2012021429 A1 | * | 2/2012 | ............. | B23Q 17/005 |
| WO | WO-2019021513 A1 | * | 1/2019 | ............. | B23Q 3/00 |
| WO | WO-2019181847 A1 | * | 9/2019 | ............. | B23B 31/16 |
| WO | WO-2020179674 A1 | * | 9/2020 | ....... | B23B 31/16283 |
| WO | 2020 212 132 A1 | | 10/2020 | | |
| WO | WO-2020193354 A1 | * | 10/2020 | ............. | H04Q 9/00 |

OTHER PUBLICATIONS

German Search Report dated Dec. 6, 2021 in German Application No. 10 2021 107 489.4 with English translation of the relevant parts.

* cited by examiner

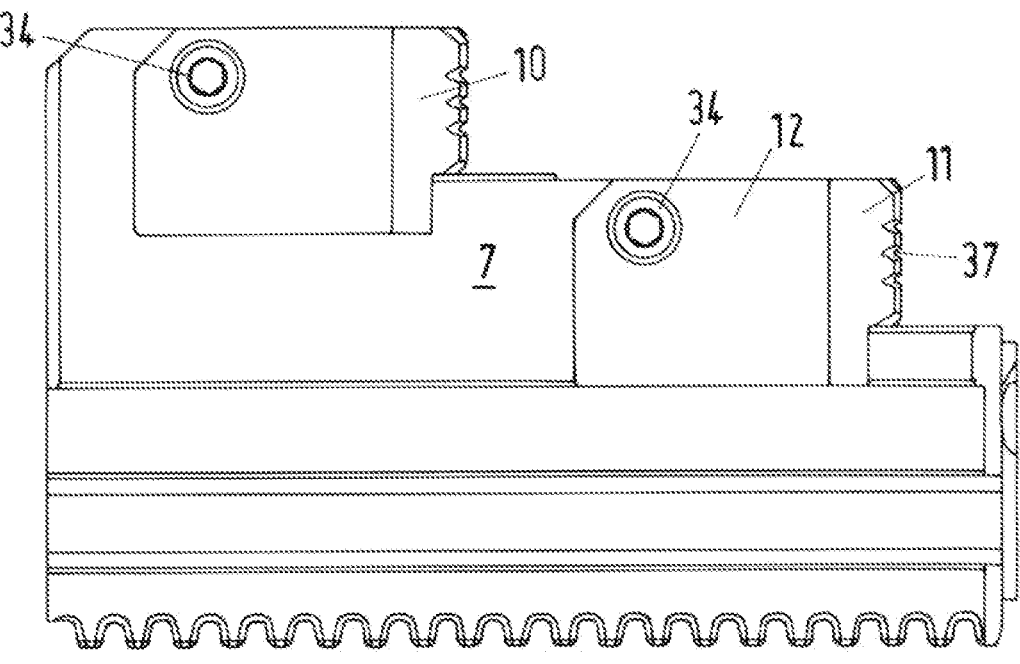
Fig.5
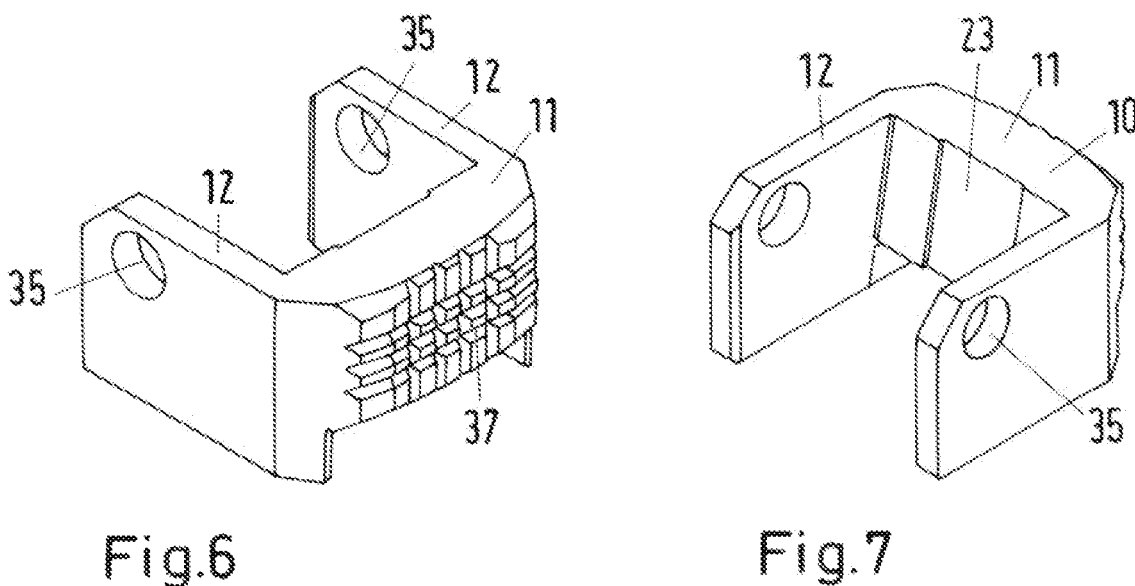
Fig.6                    Fig.7

CLAMPING JAW AND CHUCK

CROSS REFERENCE TO RELATED APPLICATIONS

This application is the National Stage of PCT/EP2022/056667 filed on Mar. 15, 2022, which claims priority under 35 U.S.C. § 119 of German Application No. 10 2021 107 489.4 filed on Mar. 25, 2021, the disclosure of which is incorporated by reference. The international application under PCT article 21 (2) was not published in English.

The invention relates to a clamping jaw for a chuck, having a jaw body on which at least one jaw step is formed, which step has a step head having a sensor on its end face, for holding a clamping insert that is formed from a base leg and two fastening legs that project away from the base leg, wherein a threaded bore is formed, in each instance, on the opposite longitudinal sides of the step head, to hold a fastening screw, the screw head of which is held in a passage opening that is formed in the fastening leg of the clamping insert, which leg is assigned to the longitudinal side, and wherein on each side, the longitudinal axes of the threaded bore and of the passage opening assigned to it have an offset when the base leg rests against the end face. The invention furthermore relates to a chuck.

The clamping force of a clamping means such as a chuck is subject to diverse interference variables during operation, in particular, namely centrifugal forces, active friction or wear. For this reason, in spite of the known activation force, the clamping force that acts on the tool or workpiece to be clamped is never precisely known, and this is disadvantageous with regard to operation of the clamping means, since an insufficient clamping force can lead to the result that the clamped object is slung away. Furthermore, the machining precision can suffer, since an overly great clamping force can lead to a deformation, and an overly low clamping force might not guarantee that the position is secured.

From DE 10 2019 109 856 A1 of the same applicant, it is known, in the case of a clamping jaw, to arrange a sensor for detecting the clamping jaws on a bending beam, wherein holders for an electronics housing and an energy storage unit are formed in the jaw body, and furthermore energy and data lines are introduced into the clamping jaw to connect the components. Lateral grooves are formed on the step head, into which grooves the clamping insert is introduced using guide strips. This clamping jaw has proven itself, in the sense that the clamping force can be precisely detected by means of the sensor. However, production of the clamping inserts is complicated because of the guide strips, with many work steps and accordingly high costs.

From DE 20 2013 104 141 U1, a clamping jaw arrangement is known, in which a replacement jaw is arranged, in a replaceable manner, on a support jaw, wherein the U-shaped replacement jaw is arranged in opposite grooves of the support jaw, and a threaded bore is provided in the support jaw, which bore serves to hold a securing screw, which secures the replacement jaw relative to the support jaw with its head. The threaded bore is formed in a step of the support jaw, in the region facing the replacement bore, the use of which region is established accordingly by the threaded bore.

The invention is based on the task of configuring a clamping jaw of the type stated initially in such a manner that its structure is simplified, with the continuing, unchanged possibility of precisely determining the actual clamping force that is in effect. It is furthermore the task of the invention to make an improved chuck available.

This task is accomplished by means of a clamping jaw having the characteristics of claim 1, and by means of a chuck having the characteristics of claim 11. Advantageous embodiments with practical further developments of the invention are indicated in the dependent claims.

The clamping jaw according to the invention, mentioned initially, is characterized in that the base legs are formed to be planar on the side facing the step head, and can be produced in a very simple manner, wherein only the passage opening additionally needs to be introduced, as compared with the previously known clamping jaw. In this regard, it is ensured that the clamping force can be precisely detected, without any change, by means of the offset that exists between the threaded bore and the passage opening and brings about a deformation of the clamping insert when force is applied, to such an extent that no force is absorbed by way of the screw head, so that the flow of force takes place by way of the end face that has the sensor. By means of the elimination of the grooves used for the connection to the clamping insert, the rigidity of the clamping jaw is increased, and thereby the notch stresses are also reduced, so that the useful lifetime of the clamping jaw is increased.

In this regard, it is advantageous that the fastening screws are formed as cylinder screws having a cylindrical screw head. Furthermore, the related recesses in the clamping insert can be structured to be somewhat larger and slightly offset in their position, so that in the event of workpiece stress, the screw heads do not support themselves on the recesses of the clamping insert and the flow of force is not disrupted thereby.

A defined introduction of force into the step head is promoted if an undercut is formed with a console radius below the step head, at the base of the jaw step, and if a groove is formed on both sides of the step head, offset in the direction of the end face relative to the threaded bores, which groove runs parallel to the end face. It should be noted that these grooves are not used for coupling the clamping insert, and therefore are functionally different from the grooves used for this purpose, and, in particular, can have a lesser depth.

If the end face on the step head runs inclined by a console angle from the outside to the inside, relative to the longitudinal axis, a pull-down effect exists when a workpiece or a tool is clamped in place, wherein a process-safe pull-down is promoted, and it is indicated if the console angle amounts to between 7° and 12°, in particular 10°.

It is furthermore advantageous if the side of the base leg of the clamping insert that faces the end face runs at an incline with a clamping insert console angle that is 0.20° to 0.50° smaller than the console angle. As a result, a lead angle □□ is formed, which ensures a more uniform surface pressure on the end face and leads to less wear.

If workpieces having individual clamping diameters must be clamped, relatively soft clamping inserts are used, which are turned out using a turning tool in the installed state. If these soft clamping inserts were secured by means of cylindrical screw heads, their position would be undefined and the clamping inserts would vibrate while being turned out. This would lead to a poor surface quality and poor dimensional precision. For this reason, a clamping insert that requires turning out is made available together with a countersunk screw, in which insert the passage opening has a conical surface as a countersunk bore on the outside. As a result, the positioning is predetermined in a fixed manner, and vibrations are effectively prevented.

In this regard, the longitudinal axis determined by the conical surface and the longitudinal axis of the related threaded bore have a center offset, and thereby when the countersunk screw is tightened, the clamping insert is drawn against the step head, any possible play is eliminated, and ultimately a defined position is brought about. After being turned out, the countersunk screw can once again be replaced with the fastening screw that has the cylindrical screw head.

In order to minimize the notch stresses in the jaw guide of the chuck, a guide strip that is T-shaped in cross-section is formed on the jaw body, in which strip an undercut having a double recess is formed in every throat. This brings about a clear increase in the radius, wherein the surface area of the jaw guide is barely reduced.

The effects and advantages mentioned above apply analogously also for a chuck having clamping jaws of the type mentioned above.

The characteristics and combinations of characteristics mentioned above in the specification, as well as the characteristics and combinations of characteristics mentioned below in the figure description and/or only shown in the figures, can be used not only in the combination indicated, in each instance, but rather also in other combinations or by themselves, without departing from the scope of the invention. Therefore embodiments that are not explicitly shown in the figures or described, but are evident from and can be produced from the embodiments explained, by means of separated combinations of characteristics, should also be viewed as being covered by and disclosed by the invention.

Figure 2:
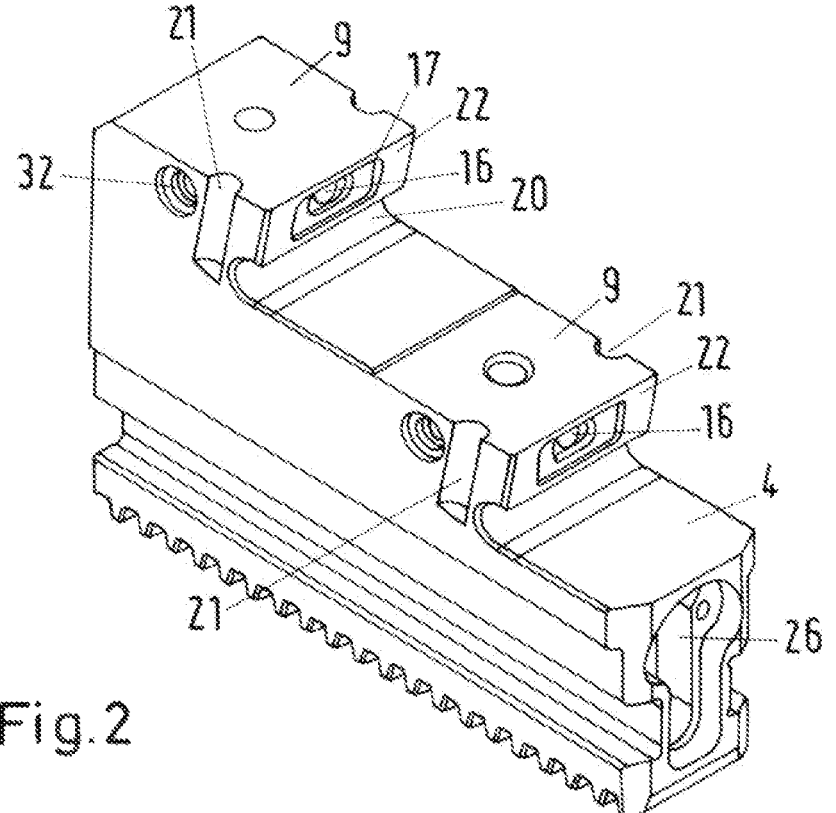
Figure 3:
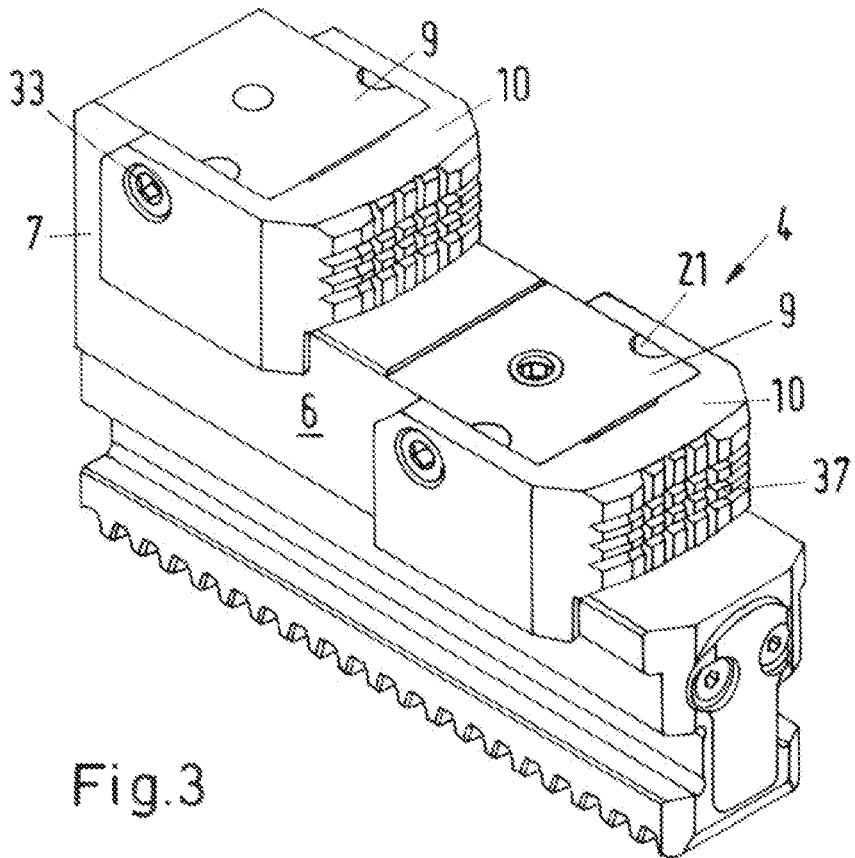
Figure 4:
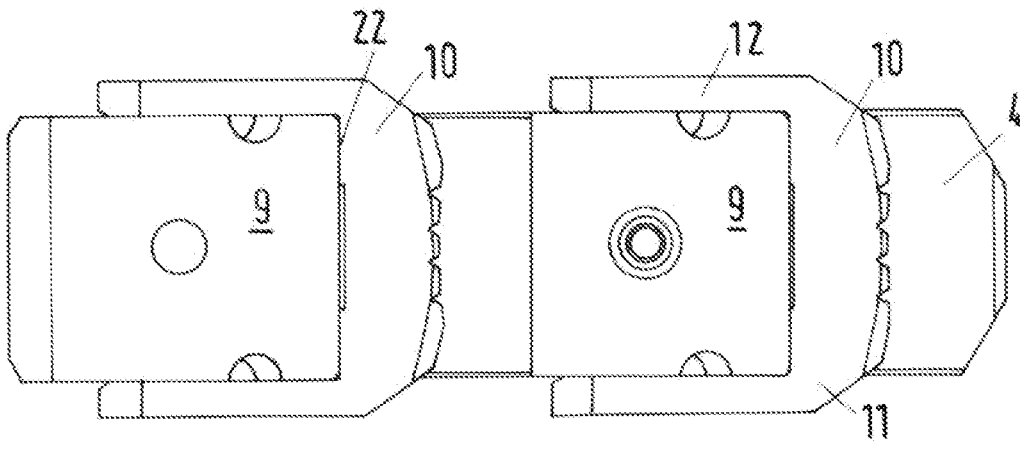
Figure 8:
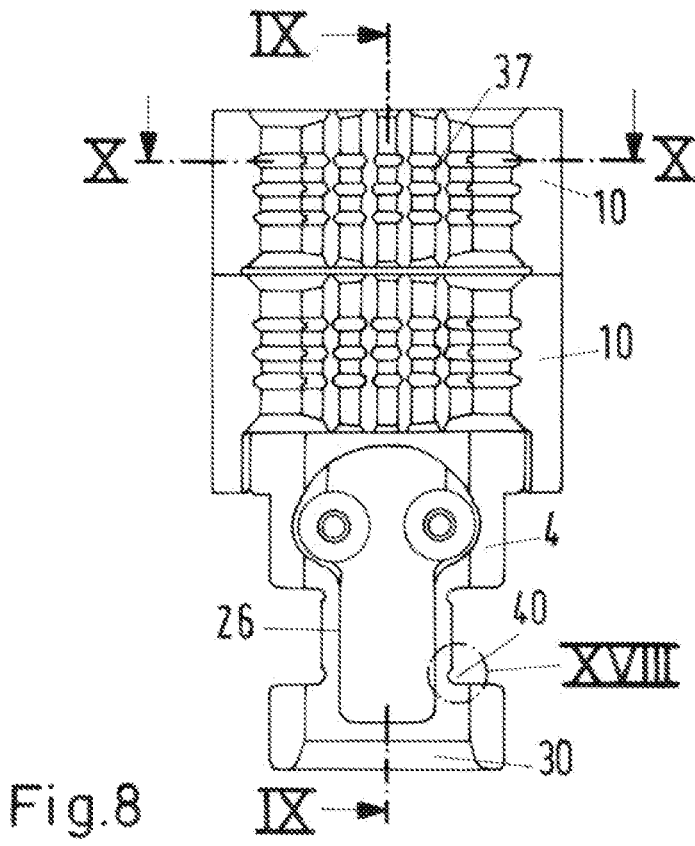
Figure 9:
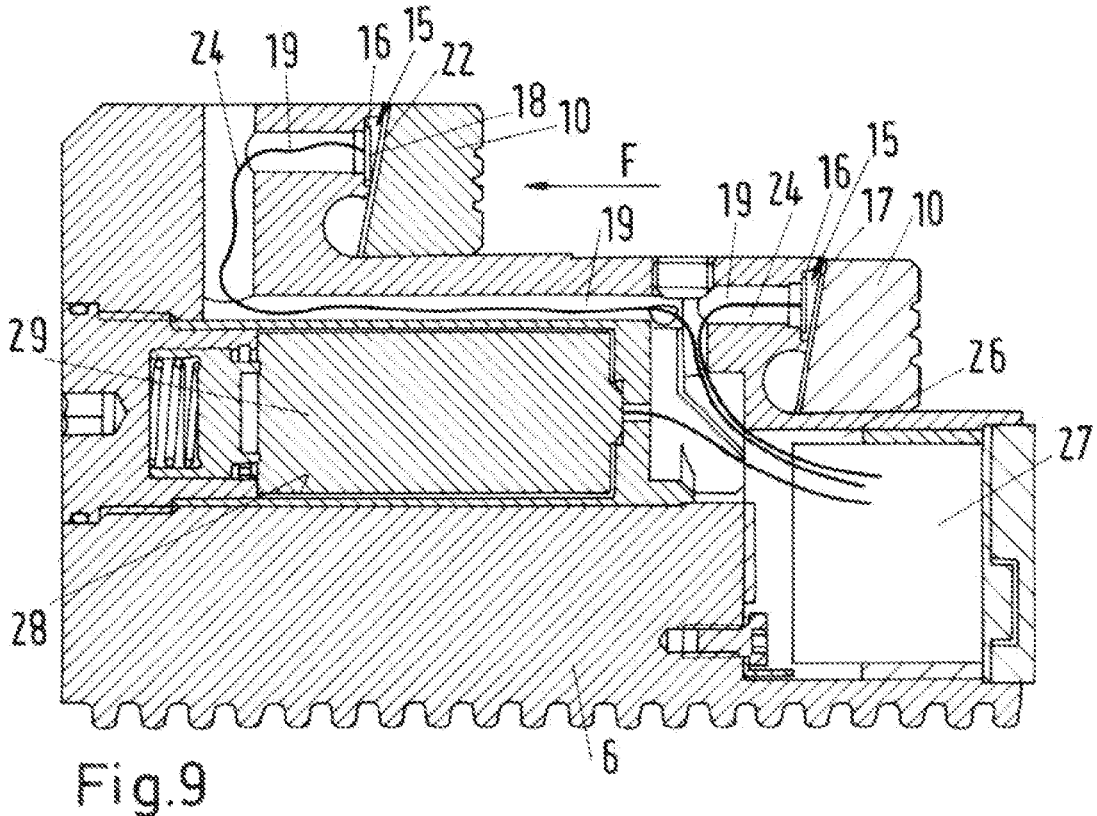
Figure 10:
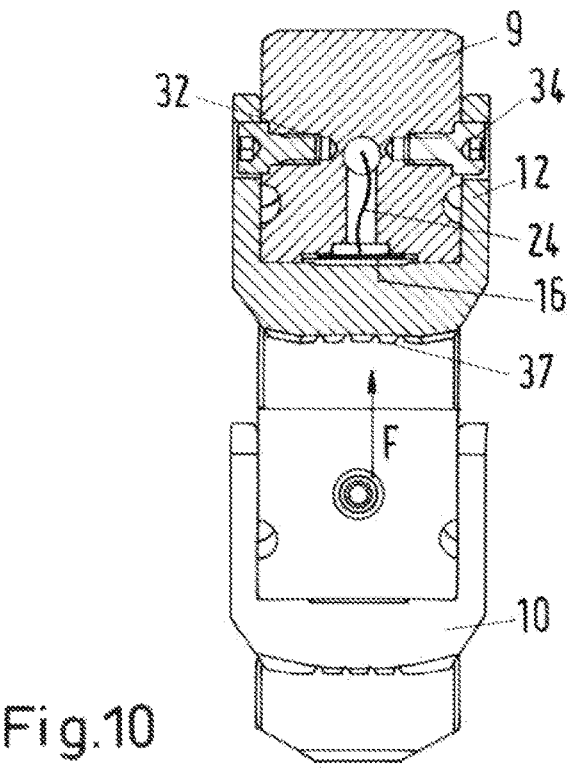
Figure 11:
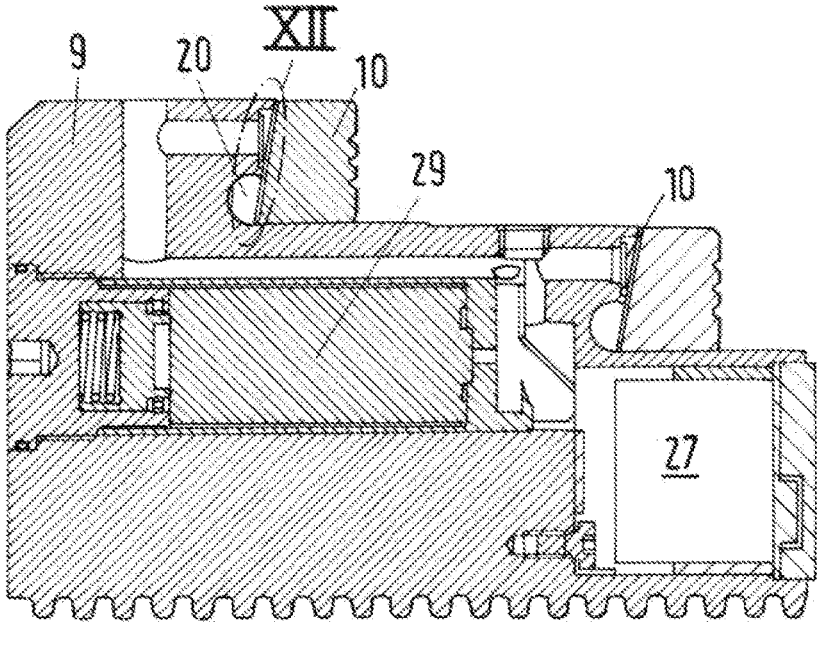
Figure 12:
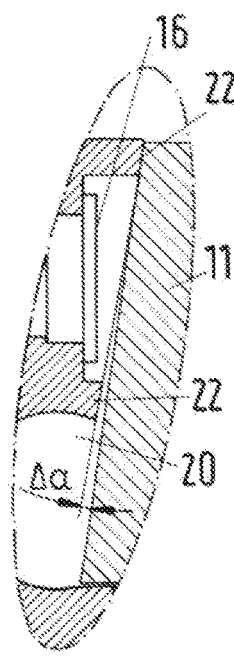
Figure 13:
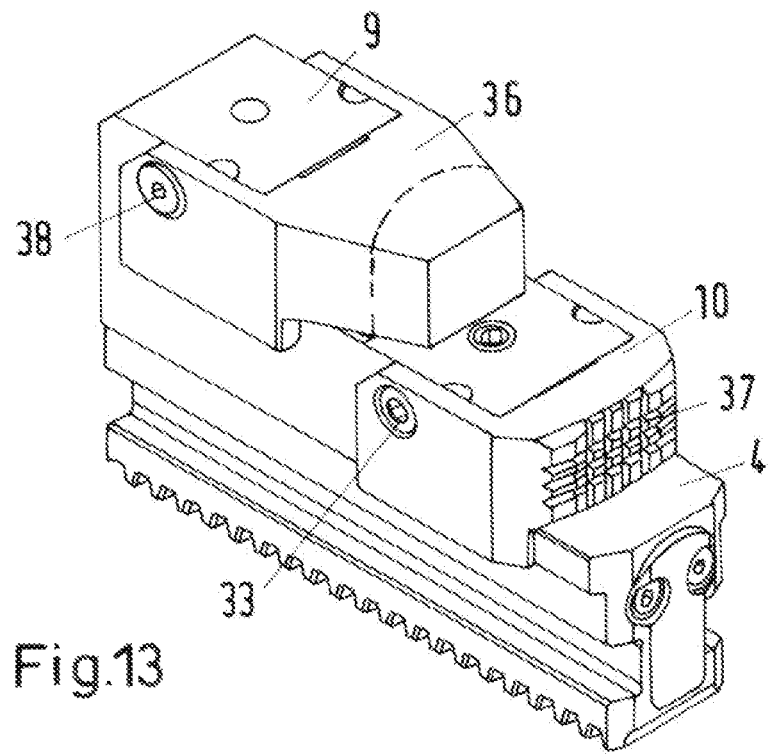
Figure 14:
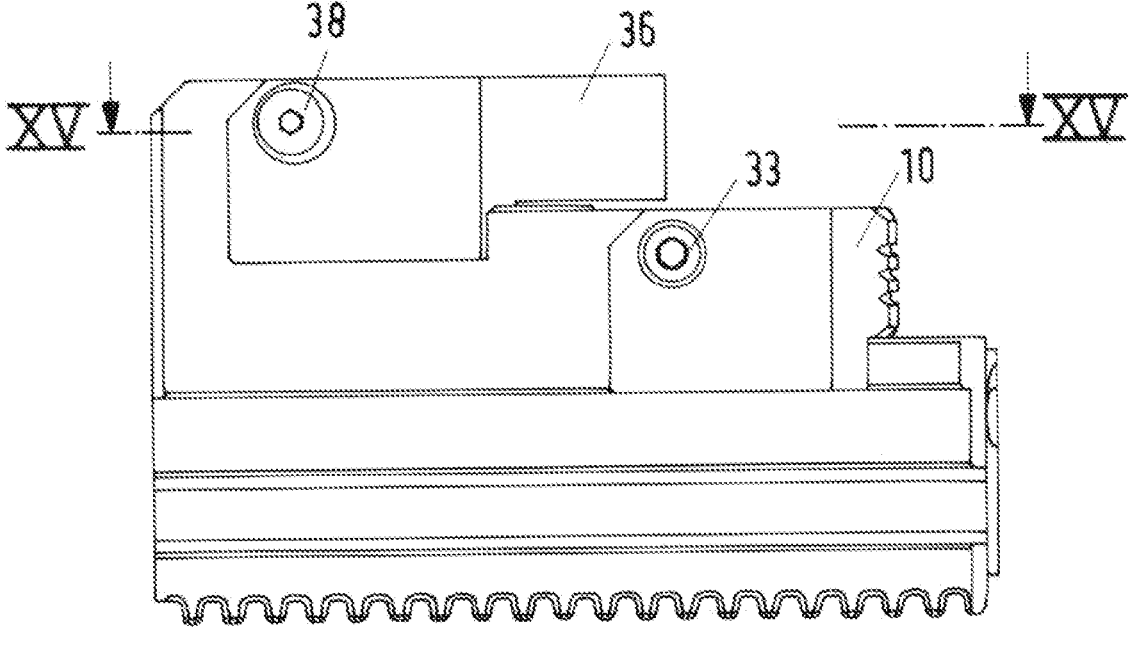
Figure 15:
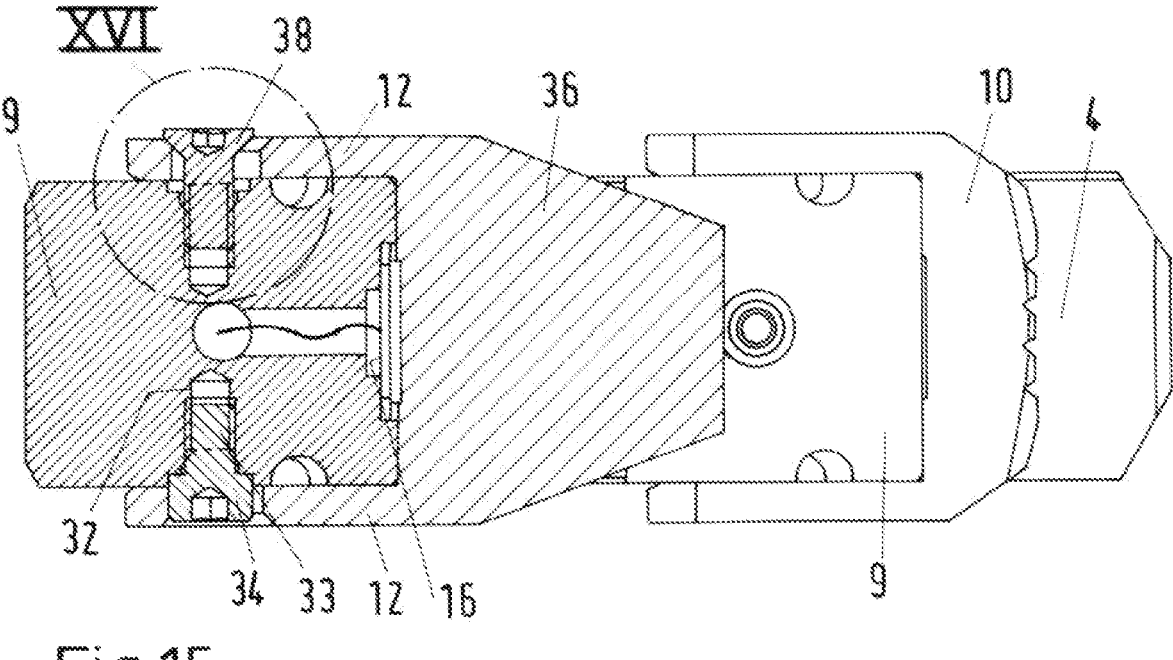
Figure 16:
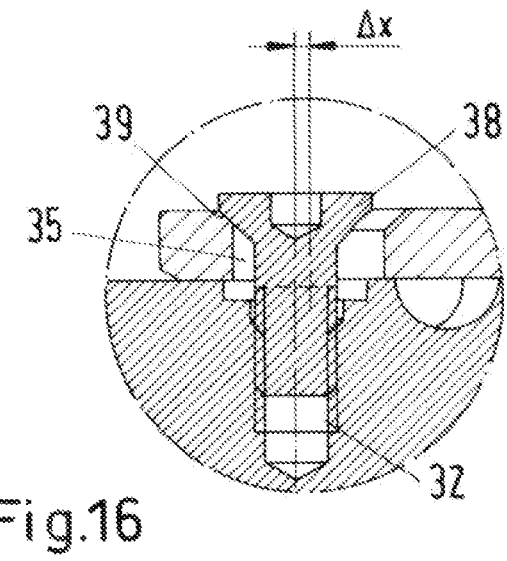
Figure 17:
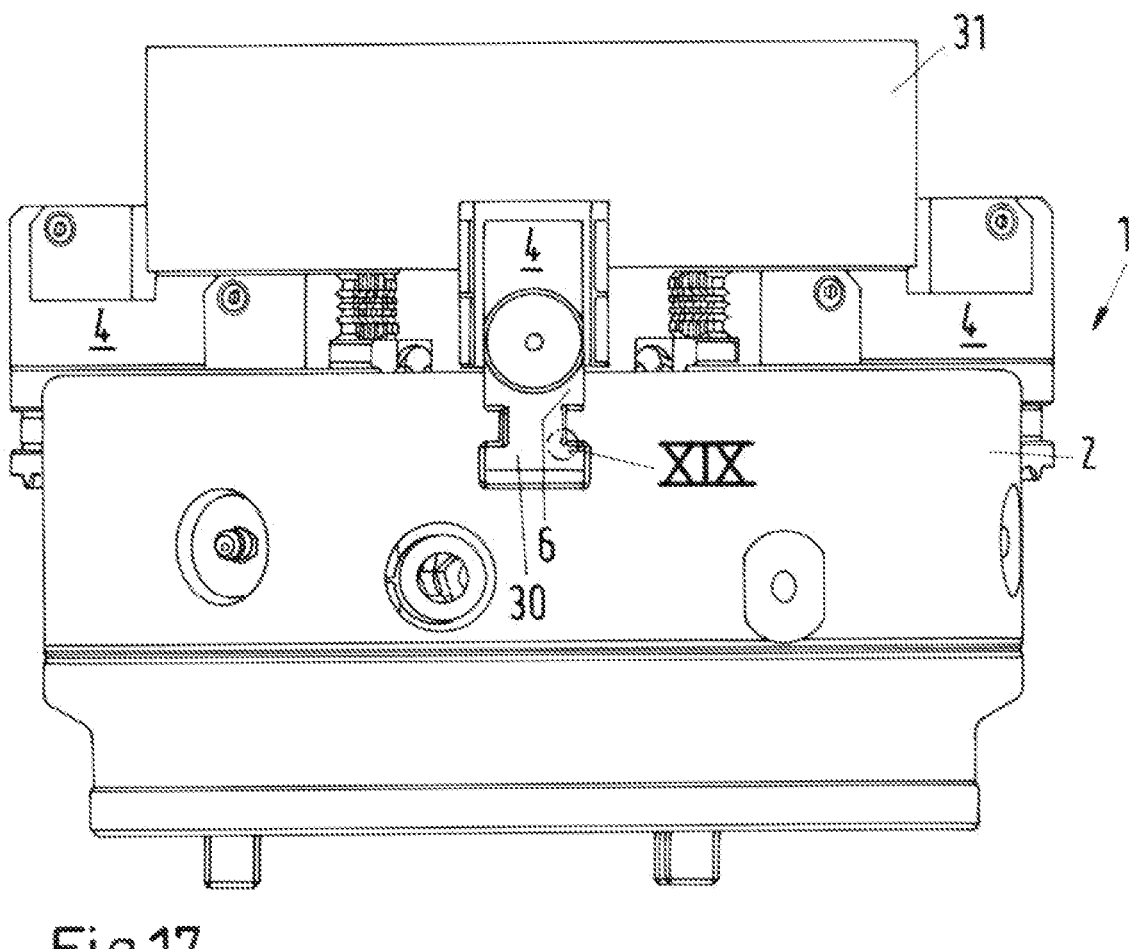
Figures 18, 19:
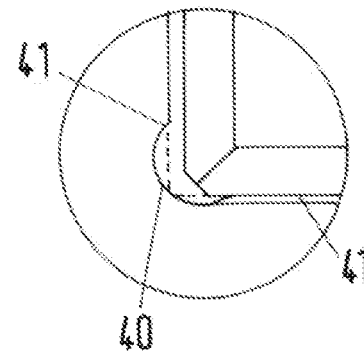

Further advantages, characteristics, and details of the invention are evident from the claims, the following description of preferred embodiments, as well as the drawings. These show:

FIG. 1 a perspective representation of a chuck having three clamping jaws, with a workpiece clamped in place in an external clamp, with symbolically represented data transmission from one of the clamping jaws, FIG. 2 a perspective representation of an isolated clamping jaw, without clamping inserts, FIG. 3 a representation of an isolated clamping jaw, corresponding to FIG. 2, having two clamping inserts, FIG. 4 a top view of the clamping jaw from FIG. 3, FIG. 5 a side view of the clamping jaw from FIG. 3, FIG. 6 a perspective view of an isolated clamping insert, FIG. 7 a perspective view of an isolate clamping insert in a perspective that deviates from FIG. 6, FIG. 8 a front view of the clamping jaw from FIG. 3, FIG. 9 the section along the line IX-IX from FIG. 8, FIG. 10 the section X-X from FIG. 8, FIG. 11 a representation corresponding to FIG. 9, for alignment of the clamping insert, FIG. 12 the detail XII from FIG. 11, FIG. 13 a representation corresponding to FIG. 3, with an alternative clamping insert at the upper jaw head, FIG. 14 a side view of the clamping jaw from FIG. 13, FIG. 15 the section XV-XV from FIG. 14, FIG. 16 the detail XVI from FIG. 15, FIG. 17 a side view of the chuck from FIG. 1, FIG. 18 the detail XVIII from FIG. 8, and FIG. 19 the detail XIX from FIG. 17.

In FIG. 1, a chuck 1 is shown that has a chuck body 2, in which clamping jaws 4 are arranged in radial jaw guides 3 distributed uniformly over the circumference. In the exemplary embodiment shown, three radial jaw guides 3 having correspondingly inserted three clamping jaws 4 are shown, wherein, however, a different number of radial jaw guides 3 having assigned clamping jaws 4 is also possible, in particular also a chuck 1 having two clamping jaws 4 or 4, 5, 6 or more than 6 clamping jaws 4. In standard use, the chuck 1 is assigned, in a usual manner, to the working spindle of a machine tool, wherein rotator drive of the chuck 1 takes place by means of the machine tool, as does provision of the activation force to produce the desired clamping force. The radio waves shown symbolically in FIG. 1 indicate the transmission of data to be transmitted wirelessly from the clamping jaws 4 used in the chuck 1 to a reception unit of the machine tool.

The clamping jaws 4 themselves are shown in detail in FIGS. 2 to 5 and have a jaw body 6, on which at least one jaw step 7 is formed, having a step head 9 for holding a clamping insert 10.

In the exemplary embodiment shown, two of the jaw steps 7 are shown, wherein here, too, it holds true that a different number is possible, in other words also a clamping jaw 4 having only one jaw step 7, having three jaw steps 7 or having four or five jaw steps 7 can be implemented, depending on the demands of the required clamping conditions. It should be pointed out that the jaw body 6 of the clamping jaw 4 is structured as a step reversal jaw, in other words, in a simple manner, a switch from the outer clamping of the workpiece 31 shown in FIG. 1 to an inner clamping is possible by means of simple reversal of the clamping jaws 4 in the jaw guides 3 of the chuck 1.

The clamping jaw 4 has a sensor 16 on each jaw step 7, on the end face 22 of the step head 9. Furthermore, the step head 9 is configured for holding the clamping insert 10, which is formed from a base leg 11 and two fastening legs 12 that project away from the base leg 11. On the opposite longitudinal sides of the step head 9, a threaded bore 32 is formed, in each instance, for holding a fastening screw 33, the screw head 34 of which is held in a passage opening 35 that is formed in the fastening leg 12 of the clamping insert 10 that is assigned to the longitudinal side. On each side, the longitudinal axes of the threaded bore 32 and the passage opening 35 assigned to it form an offset when the base leg 11 lies against the end face 22. As FIG. 10, in particular, shows, the fastening screws 33 are formed as cylinder screws having a cylindrical screw head. By means of this structure, it is guaranteed that when a clamping force is in effect, the clamping insert 10 can deform, in such a manner that no clamping force is absorbed by way of the screw head 34, and the sensor 16 can correctly detect the total clamping force that is in effect.

Below the step head 9, an undercut 20 is formed at the base of the jaw step 7, having a console radius, wherein a groove 21 is formed on the two sides of the step head 9, in each instance, offset relative to the threaded bores 32 in the direction of the end face 22, which groove runs parallel to the end face 22, so that a defined region is delimited for the introduction of force.

The end face 22 on the step head 9 runs, from the outside to the inside, inclined relative to the longitudinal axis by a console angle, wherein in the exemplary embodiment shown in FIGS. 11 and 12, the console angle amounts to 10°. It should be noted, in this regard, that the side of the base leg 11 of the clamping insert that faces the end face 22 runs at an incline at a clamping insert console angle that is 0.20° to 0.50° smaller than the console angle. In the exemplary embodiment, a clamping insert console angle of 9.75° is shown, which thereby is smaller than the console angle by a lead angle $\Delta\alpha$ of 0.25°.

FIGS. 13 to 16 show the case that a clamping insert 36 that requires turning out must be used for clamping a workpiece 31 having an individual clamping diameter. The contour to be achieved by turning it out is shown with a broken line in FIG. 13. This clamping insert 36 that requires turning out is relatively soft, in any case softer than the conventional clamping insert 10 that is shown in FIG. 13 with a fluted gear mechanism 37. For the purpose of turning it out, the clamping insert 36 that requires turning out is made available together with a countersunk screw 38, in which the passage opening 35 has a conical surface 39 on the outside, as a countersunk bore, wherein the longitudinal axis determined by the conical surface 39 and the longitudinal axis of the related threaded bore 32 have a center offset Δx (FIG. 16). For the purpose of turning it out, the countersunk screw 38 is used, so as to guarantee an unambiguous fixation of the position of the clamping insert 36 that requires turning out, wherein after it is turned out, the countersunk screw 38 is replaced with the fastening screw 33 having the cylindrical screw head 34, as shown in FIG. 15 on the side that lies on the bottom.

FIGS. 18 and 19 indicated that a guide strip 30 that is T-shaped in cross-section is formed on the jaw body 6, on which strip an undercut 40 having a double recess 41 is formed in every throat, and this allows a clear increase in the size of the radius, to reduce the notch stress, as compared with the conventional embodiment shown with broken lines in FIG. 19.

In general, it holds true that a sensor location 15 is formed on the end face 22 for placement of the sensor 16. In this regard, the sensor location 15 is formed by a pocket 17 in which the sensor 16 is arranged. The sensor 16 itself is formed as a strain gauge 18, in particular as a metal strain gauge, which is welded on in the pocket 17, wherein the contacting surfaces are arranged by way of a passage 19, which is made available for passing through a data line and/or an energy supply line 24 (FIG. 9).

The clamping inserts 10 themselves have a shape that is U-shaped in cross-section, wherein a counter-pocket 23 is formed on the inner side of the base leg 11, in the center between the fastening legs 12, the dimensions of which counter-pocket are coordinated with those of the pocket 17.

If clamping in place of a workpiece now takes place, as is evident from FIG. 1, then this is bent in a defined manner by means of the recess formed by the counter-pocket 23 in the clamping insert 10 and by means of the pocket 17 in the end face, in the manner of a bending beam, namely stretched, and this also has an effect on the strain gauge 18, and this brings about a change in resistance or tension that is proportional to the clamping force that is in effect. In this regard, the undercut 20 below the step head 9 brings about a non-disrupted, homogeneous flow of force.

It should furthermore be noted that for protecting the sensor 16, the pocket 17 that holds the sensor 10 is closed off by means of a cover, which can preferably be removed only in a destructive manner. Finally, it is also evident that a first holder 26 for an electronics housing 27 is provided in the jaw body 6, which holder is connected with the pocket 17 by way of the passage 19, and that a second holder 28 for an energy storage unit 29, in particular a rechargeable battery or a capacitor, is provided in the jaw body 6, which holder is also connected with the passage 19 of the pocket 17. The data recorded by the metal strain gauge 18 can thereby be passed along to the electronics housing 27, in which the required electronics components for data collection and evaluation are accommodated, wherein the raw data or processed data of the sensor 16 are made available to the machine tool in a contact-free manner, by way of a receiver unit.

REFERENCE SYMBOL LIST 1 chuck
2 chuck body 3 jaw guide
4 clamping jaw
5 radio waves
6 jaw body
7 jaw step
9 step head
10 clamping insert
11 base leg
12 fastening leg
15 sensor location
16 sensor
17 pocket
18 strain gauge
19 passage
20 undercut
21 groove
22 end face
23 counter-pocket
24 data line/energy supply line
26 first holder
27 electronics housing
28 second holder
29 energy storage unit
30 guide strip
31 workpiece
32 threaded bore
33 fastening screw
34 screw head
35 passage opening
36 clamping insert that must be turned out
37 fluted gear mechanism
38 countersunk screw
39 conical surface
Δα lead angle
Δx center offset

The invention claimed is:

1. A clamping jaw for a chuck, the clamping jaw comprising:
a jaw body on which a jaw step is formed, which jaw step has a step head having a first longitudinal side, a second longitudinal side opposite the first longitudinal side, a front face disposed between the first longitudinal side and the second longitudinal side, a first threaded bore formed in the first longitudinal side, a second threaded bore formed in the second longitudinal side and a sensor disposed at the front face,
a clamping insert formed from a base leg, a first fastening leg projecting away from the base leg and a second fastening leg spaced apart from the first fastening leg and projecting away from the base leg, wherein a first passage opening is formed in the first fastening leg and a second passage opening is formed in the second fastening leg,
wherein the jaw step is configured to hold the clamping insert with the base leg of the clamping insert resting against the front face of the step head,
a first fastening screw having a first screw head held in the first passage opening formed in the first fastening leg of the clamping insert, which first fastening leg is adjacent to the first longitudinal side of the step head, and
a second fastening screw having a second screw head held in the second passage opening formed in the second fastening leg of the clamping insert, which second fastening leg is adjacent to the second longitudinal side of the step head,
wherein a first longitudinal axis of the first threaded bore is offset from a first longitudinal axis of the first passage opening and a second longitudinal axis of the second threaded bore is offset from a second longitudinal axis of the second passage opening, as a result of the base leg of the clamping insert resting against the front face of the step, to such an extent that no force is absorbed by the first screw head or the second screw head as a clamping force is applied.

2. The clamping jaw according to claim 1, wherein the first fastening screw and the second fastening screw are formed as cylinder screws and the first screw head and the second screw head are cylindrical screw heads.

3. The clamping jaw according to claim 1, wherein an undercut having a radius is formed below the step head on a base of the jaw step.

4. The clamping jaw according to claim 3, wherein a first groove is formed on the first longitudinal side of the step head between the front face and the first threaded bore and runs parallel to the front face, and a second groove is formed on the second longitudinal side of the step head between the front face and the second threaded bore and runs parallel to the front face.

5. The clamping jaw according to claim 1, wherein the front face of the step head runs inclined at an angle relative to a longitudinal axis of the step head.

6. The clamping jaw according to claim 5, wherein the angle amounts to between 7° and 12°.

7. The clamping jaw according to claim 5, wherein a side of the base leg of the clamping insert that faces the front face runs at an incline with a clamping insert angle that is 0.20° to 0.50° smaller than the angle of the front face.

8. The clamping jaw according to claim 1, wherein the clamping insert requires turning to achieve a contour, the first fastening screw comprises a first countersunk screw the first passage opening has a first conical surface forming a first countersunk bore on an outside of the first passage opening, the second fastening screw comprises a second countersunk screw, and the second passage opening has a second conical surface forming a second countersunk bore on an outside of the second passage opening.

9. The clamping jaw according to claim 8, wherein a central longitudinal axis of the first conical surface is offset from a central longitudinal axis of the first threaded bore.

10. The clamping jaw according to claim 1, wherein a guide strip that is T-shaped in cross-section is formed on the jaw body, in which guide strip, a groove having a double recess is formed in every side.

11. A chuck having a chuck body, in which clamping jaws according to claim 1 are arranged in radial jaw guides uniformly distributed over a circumference of the chuck body.

* * * * *